United States Patent
Suhara et al.

(10) Patent No.: US 11,934,783 B2
(45) Date of Patent: Mar. 19, 2024

(54) SYSTEMS AND METHODS FOR ENHANCED REVIEW COMPREHENSION USING DOMAIN-SPECIFIC KNOWLEDGEBASES

(71) Applicant: Recruit Co., Ltd., Tokyo (JP)

(72) Inventors: Yoshihiko Suhara, Los Altos, CA (US); Behzad Golshan, Mountain View, CA (US); Yuliang Li, Cupertino, CA (US); Chen Chen, Sunnyvale, CA (US); Xiaolan Wang, Mountain View, CA (US); Jinfeng Li, Mountain View, CA (US); Wang-Chiew Tan, San Jose, CA (US); çagatay Demiralp, Mountain View, CA (US); Aaron Traylor, Providence, RI (US)

(73) Assignee: RECRUIT CO., LTD., Toyko (JP)

( * ) Notice: Subject to any disclaimer, the term of this patent is extended or adjusted under 35 U.S.C. 154(b) by 0 days.

(21) Appl. No.: 18/295,735

(22) Filed: Apr. 4, 2023

(65) Prior Publication Data
US 2023/0281390 A1     Sep. 7, 2023

Related U.S. Application Data

(63) Continuation of application No. 17/008,572, filed on Aug. 31, 2020, now Pat. No. 11,620,448.

(51) Int. Cl.
   *G06F 40/284*     (2020.01)
   *G06F 16/35*     (2019.01)
   *G06F 18/211*     (2023.01)
   *G06N 7/01*     (2023.01)

(52) U.S. Cl.
   CPC ............ *G06F 40/284* (2020.01); *G06F 16/35* (2019.01); *G06F 18/211* (2023.01); *G06N 7/01* (2023.01)

(58) Field of Classification Search
CPC ...... G06F 40/284; G06F 16/35; G06F 18/211; G06F 40/30; G06N 7/01; G06N 5/022; G06N 3/045
USPC .............................................. 704/9
See application file for complete search history.

(56) References Cited

U.S. PATENT DOCUMENTS

2019/0377746 A1    12/2019    Kataoka et al.

FOREIGN PATENT DOCUMENTS

JP            2020-042131      3/2020
WO    WO 2020/100738 A1      5/2020

OTHER PUBLICATIONS

International Search Repot and Written Opinion issued in related PCT International Application No. PCT/JP2021/030383; dated Nov. 16, 2021 (8 pgs.).

*Primary Examiner* — Thierry L Pham
(74) *Attorney, Agent, or Firm* — Finnegan, Henderson, Farabow, Garrett & Dunner, LLP

(57) ABSTRACT

Disclosed embodiments relate to natural language processing. Techniques can include receiving input text, extracting, from the input text, at least one modifier and aspect pair, receiving data from a knowledgebase, based on the at least one modifier and aspect pair and commonsense data, generate one or more premise embeddings, convert the input text into tokens, generating at least one vector for one or more of the tokens based on an analysis of the tokens, combine the at least one vector with the one or more premise embeddings to create at least one combined vector, and analyze the at least one combined vector wherein the analysis generates an output indicative of a feature of the input text.

20 Claims, 8 Drawing Sheets

| Domain | Premise | Conclusion |
|---|---|---|
| Hospitality | thin walls | noisy room |
| Hospitality | near beach | good location |
| Restaurants | good music | great vibe |
| Restaurants | rude hostess | poor service |
| Laptops | rich bass | crisp sound |
| Laptops | excellent contrast | good image |

Fig. 2

SYSTEMS AND METHODS FOR ENHANCED REVIEW COMPREHENSION USING DOMAIN-SPECIFIC KNOWLEDGEBASES

CROSS-REFERENCE TO RELATED APPLICATIONS

This application is a continuation of application Ser. No. 17/008,572, filed Aug. 31, 2020, which is incorporated herein by reference in its entirety.

BACKGROUND

Natural language processing systems allow computers to analyze natural language input. Many natural language processing tasks utilize existing pre-trained models. These generic models, however, can struggle when faced with trying to perform natural language tasks tailored to a specific domain. There is a need for techniques and systems which can easily and efficiently create and use domain specific knowledgebases to improve the performance of natural language processing applications.

SUMMARY

Certain embodiments of the present disclosure relate to a non-transitory computer readable storage medium storing instructions that are executable by a review comprehension system that includes one or more processors to cause the review comprehension system to perform a method for natural language processing. The method can include receiving input text, extracting, from the input text, at least one modifier and aspect pair, receiving data from a knowledgebase, based on the at least one modifier and aspect pair and commonsense data, generate one or more premise embeddings, convert the input text into tokens, generating at least one vector for one or more of the tokens based on an analysis of the tokens, combine the at least one vector with the one or more premise embeddings to create at least one combined vector, and analyze the at least one combined vector wherein the analysis generates an output indicative of a feature of the input text.

According to some disclosed embodiments, the input text can include a review, and the output indicative of a feature of the input text can be a probability for at least one token of the tokens an aspect of the review.

According to some disclosed embodiments, the input text can include a review and an aspect, and the output indicative of a feature of the input text can be at least one of a probability that the review's opinion of the aspect is negative, a probability that the review's opinion of the aspect is neutral, and a probability that the review's opinion of the aspect is negative.

According to some disclosed embodiments, the input text can include a review and a question, and the output indicative of a feature of the input text can be a span that represents an answer to the question.

According to some disclosed embodiments, analyzing the combined vector can further include identifying, using a classifier, the probability for at least one token of the tokens, that the token is the end of an answer to the question.

According to some disclosed embodiments, analyzing the combined vector can further include identifying, using a classifier, the probability for at least one token of the tokens, that the token is the end of an answer to the question.

According to some disclosed embodiments, analyzing the tokens can include processing the tokens using BERT.

Certain embodiments of the present disclosure relate to a computer implemented method for natural language processing. The method can include receiving input text, extracting, from the input text, at least one modifier and aspect pair, receiving data from a knowledgebase, based on the at least one modifier and aspect pair and commonsense data, generate one or more premise embeddings, convert the input text into tokens, generating at least one vector for one or more of the tokens based on an analysis of the tokens, combine the at least one vector with the one or more premise embeddings to create at least one combined vector, and analyze the at least one combined vector wherein the analysis generates an output indicative of a feature of the input text.

According to some disclosed embodiments, the input text can include a review, and the output indicative of a feature of the input text can be a probability for at least one token of the tokens an aspect of the review.

According to some disclosed embodiments, the input text can include a review and an aspect, and the output indicative of a feature of the input text can be at least one of a probability that the review's opinion of the aspect is negative, a probability that the review's opinion of the aspect is neutral, and a probability that the review's opinion of the aspect is negative.

According to some disclosed embodiments, the input text can include a review and a question; and the output indicative of a feature of the input text can be a span that represents an answer to the question.

According to some disclosed embodiments, analyzing the combined vector can further include identifying, using a classifier, the probability for at least one token of the tokens, that the token is the start of an answer to the question.

According to some disclosed embodiments, analyzing the combined vector can further include identifying, using a classifier, the probability for at least one token of the tokens, that the token is the end of an answer to the question.

According to some disclosed embodiments, analyzing the tokens includes processing the tokens using BERT.

Certain embodiments of the present disclosure relate to a review comprehension system. The review comprehension system can include one or more memory devices storing processor executable instructions, and one or more processors configured to execute the instructions to cause the review comprehension system to perform operation. The operations can include receiving input text, extracting, from the input text, at least one modifier and aspect pair, receiving data from a knowledgebase, based on the at least one modifier and aspect pair and commonsense data, generate one or more premise embeddings, convert the input text into tokens, generating at least one vector for one or more of the tokens based on an analysis of the tokens, combine the at least one vector with the one or more premise embeddings to create at least one combined vector, and analyze the at least one combined vector wherein the analysis generates an output indicative of a feature of the input text.

According to some disclosed embodiments, the input text can include a review, and the output indicative of a feature of the input text can be a probability for at least one token of the tokens an aspect of the review.

According to some disclosed embodiments, the input text can include a review and an aspect, and the output indicative of a feature of the input text can be at least one of a probability that the review's opinion of the aspect is negative, a probability that the review's opinion of the aspect is neutral, and a probability that the review's opinion of the aspect is negative.

According to some disclosed embodiments, the input text can include a review and a question; and the output indicative of a feature of the input text can be a span that represents an answer to the question.

According to some disclosed embodiments, the one or more processors are configured to execute the instructions to cause the review comprehension system can further perform operations for identifying, using a classifier, the probability for at least one token of the tokens, that the token is the start of an answer to the question.

According to some disclosed embodiments, the one or more processors are configured to execute the instructions to cause the review comprehension system can further perform operations for identifying, using a classifier, the probability for at least one token of the tokens, that the token is the end of an answer to the question.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 2 is a diagram showing an exemplary representation of a domain-specific knowledgebase, consistent with embodiments of the present disclosure.

DETAILED DESCRIPTION

Figure 1:
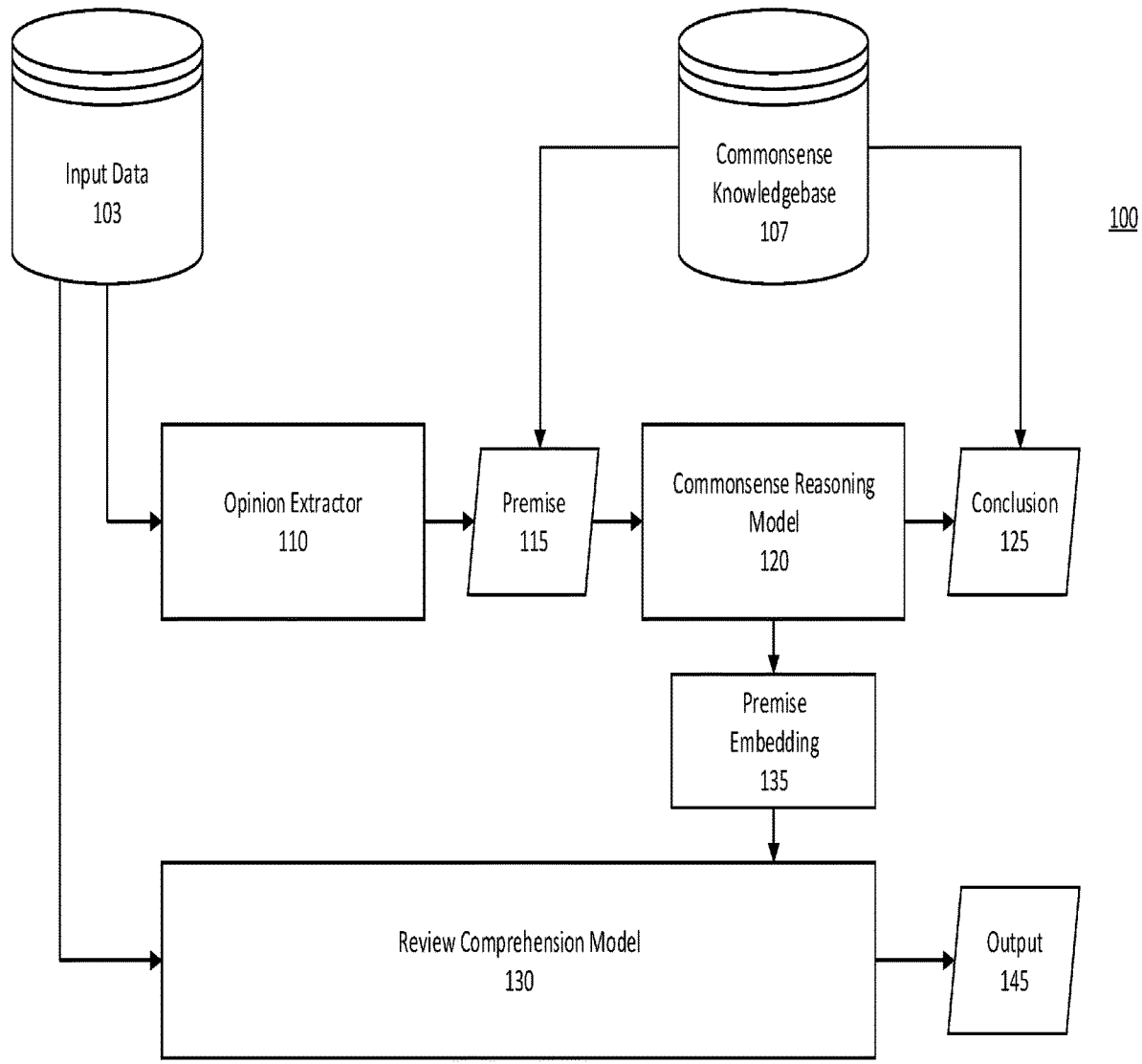
FIG. 1 is a block diagram showing various exemplary components of a review comprehension system using a domain-specific knowledge base consistent with embodiments of the present disclosure.

In the following detailed description, numerous details are set forth to provide a thorough understanding of the disclosed example embodiments. It is understood by those skilled in the art that the principles of the example embodiments may be practiced without every specific detail. The embodiments disclosed are exemplary and are intended to disclose every possible embodiment consistent with the claims and disclosure. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It is also appreciated by one of ordinary skill in the art that the use of the term "commonsense" in relation to commonsense knowledgebase 107, commonsense reasoning model 120, and as used throughout this disclosure is intended to be understood as it is commonly used in the art and is not intended to limit the scope or breadth of the claims. One of ordinary skill would understand that a commonsense knowledgebase can contain the same information as and can alternatively be described as a knowledgebase.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for automated question answering. The disclosed embodiments include the creation and use of domain-specific knowledge bases to allow for improved understanding. These knowledge bases can leverage the large amount of information that is available in feedback and reviews for varying services and products. In some instances, words and phrases can express different sentiments or opinions depending on the specific domain, service, or product. The embodiments described herein can create knowledge bases that capture sentiments for a specific domain and then use that domain-specific information to enhance review comprehensions related to that domain.

In particular, the embodiments describe herein can take a question and one or more review as input, analyze the text, and, determine an answer to the question using a domain-specific knowledgebase. Because of the creation and use of a domain-specific knowledgebase, the embodiments described herein can achieve improved performance and accuracy over previous analysis methods. These improved embodiments have significant practical applications in many fields where natural language processing according to the disclosed embodiments can be used to improve automated systems for answering questions about products or services. For example, in a hotel context, embodiments described herein could be used to provide an automated concierge responding to basic guest questions about amenities and features of the hotel.

FIG. 1 is a block diagram showing various exemplary components of a review comprehension system 100 using a domain-specific knowledge base, consistent with embodiments of the present disclosure. The review comprehension system 100 can include input data 103 that can include, among other types of data, question and review pairs. These inputs can be used by review comprehension system 100 to determine possible answers to the input question. The process for using review comprehension system 100 is discussed in more detail below in reference to FIG. 6. Other embodiments can utilize different types of input. In some embodiments, for example embodiments related to aspect extraction, the input can include only a review. In other embodiments, for example embodiments related to aspect sentiment classification, the input can include a review and a span in the review marked as a targeted aspect. The process for using review comprehension system 100 for aspect extraction and aspect sentiment classification are discussed in more detail below in relation to FIGS. 4 and 5, respectively.

Input data 103 can be a Relational Database Management System (RDBMS) (e.g., Oracle Database, Microsoft SQL Server, MySQL, PostgreSQL, or IBM DB2). An RDBMS can be designed to efficiently return data for an entire row, or record, from the database in as few operations as possible. An RDBMS can store data by serializing each row of data in a data structure. In an RDBMS, data associated with a record can be stored serially such that data associated with all categories of the record can be accessed in one operation. Moreover, an RDBMS can efficiently allow access of related records stored in disparate tables. For example, in an RDBMS, tables can be linked by a referential column and the RDBMS can join tables together to retrieve data for a data structure. In some embodiments, the input data 103 can be a non-relational database system (NRDBMS) (e.g., XML, Cassandra, CouchDB, MongoDB, Oracle NoSQL Database, FoundationDB, or Redis). A non-relational database system can store data using a variety of data structures such as, among others, a key-value store, a document store, a graph, and a tuple store. For example, a non-relational database using a document store could combine all of the data associated with a particular identifier into a single document encoded using XML. The input data 103 can also be a memory database such as Memcached. In some embodiments, the contents of input data 103 may exist both in a persistent storage database and in an in-memory database, such as is possible in Redis.

Review comprehension system 100 can include opinion extractor 110 to extract possible opinions from the input data. Opinion extractor 110 can process the input reviews and generate tuples that contain a modifier and aspect extracted from the input reviews. The tuples can be represented in text as "(modifier, aspect)". As an example, opinion extractor 110 can process the input sentence, "The bathroom is very clean but the food is average," and generate a set of tuples such as {(very clean, bathroom), (average, food)} representing the modifier and aspect pairs in the input sentence. The opinion extractor 110 can output the modifier and aspect tuples as premise 115. Opinion extractor 110 can use a sequence-to-sequence neural network model to generate the modifier and aspect candidates. Such neural network models are known in the art. Opinion extractor 110 can augment the model using commonsense knowledgebase as described in more detail below.

Premise 115 represents an expressed opinion using the aspect and the modifier. Review comprehension system 100 can provide premise 115 to commonsense reasoning model 120 for processing.

Commonsense reasoning model 120 can take as input premise 115, formatted as an (modifier, aspect) tuple, and determine what conclusions can result from the premise. Commonsense reasoning model 120 can utilize commonsense knowledgebase 107 for training and to allow commonsense reasoning model 120 to infer conclusion 125 from premise 115 as described in more detail below. Conclusion 125 can include one or more conclusions determined by the commonsense reasoning model 120 for an input premise 115.

Commonsense knowledgebase 107, can utilize a schema like that shown in FIG. 2. FIG. 2 is a representation of an exemplary domain-specific commonsense knowledgebase 200. Commonsense knowledgebase 200 can be commonsense knowledgebase 107 of FIG. 1. As shown in FIG. 2, commonsense knowledgebase 200 can include premise-conclusion mappings for multiple domains 210. For example, mappings 241 and 243 can relate to the hospitality industry, mappings 251 and 253 can relate to the restaurant industry, and mappings 261 and 263 can relate to laptop reviews or the computer industry.

In some embodiments, only premise-conclusion mappings for a single domain are stored in commonsense knowledgebase 200. In other embodiments, the premise-conclusion mappings are split among multiple commonsense knowledgebases that collectively can be commonsense knowledgebase 200.

As shown in FIG. 2, premises 220 and conclusions 230 can be represented as natural language words or phrases. Each row (e.g., rows 241, 243, 251, 253, 261, and 263) includes a premise conclusion mapping indicating a conclusion 230 that is implied by the premise 220. The process for compiling data like that shown in FIG. 2 is described in more detail below in relation to FIG. 7. As shown in FIG. 2, the commonsense knowledge base contains conclusions extracted from the premises. As an example, row 241 includes the premise "thin walls" corresponding to the conclusion "noisy room." This conclusion can make sense in a hospitality context, as shown in domain 210 of row 241, but might not make sense in other contexts. By including these domain-specific premise-conclusion pairs, commonsense knowledgebase 200 can be used to train models that provide better results than models that contain only generic premise-conclusion mappings.

Referring back to FIG. 1, Commonsense reasoning model 120 can use the embedding of premise 115 to generate conclusion 125 based on information stored in common sense knowledgebase 107. For example, an input premise 115 of "tasty sushi" in a review from a restaurant might imply conclusion 125 of "good Japanese restaurant." As another example, an input premise 115 of "short battery life" can result in a conclusion of "poor quality." The premise to conclusion mapping does not need to exist in commonsense knowledgebase 107. Because, as described above in relation to FIG. 2, commonsense knowledgebase 107 can include natural language premises (e.g., Premise 220) and conclusions (e.g., Conclusion 230). Commonsense reasoning model 120 can analyze those natural language premise-conclusion pairs and generalize beyond the literal contents of commonsense knowledgebase 107. As an example, if commonsense knowledgebase 107 includes a mapping of premise "fresh sashimi" to the conclusion "good Japanese restaurant," commonsense reasoning model 120 can determine that the premise "fresh nigiri" also results in a conclusion of "good Japanese restaurant" because of the similarities of the premises even though "fresh nigiri" may not be in commonsense knowledgebase 107.

Commonsense knowledgebase 107 can be an RDBMS as described above in relation to input data 103. In some embodiments, commonsense knowledgebase 107 can be a NRDBMS as described above in relation to input data 103. Commonsense knowledgebase 107 can also be a memory database such as Memcached. In some embodiments, the contents of commonsense knowledgebase 107 may exist both in a persistent storage database and in an in-memory database, such as is possible in Redis.

Referring back to FIG. 1, in addition to generating conclusion 125 based on premise 115, commonsense reasoning model 120 can also generate premise embedding 135. Premise embedding 135 is generated from premise 115 and augmented further by processing commonsense knowledgebase 107. Premise embedding 135 can be generated using a sequence-to-sequence model. In some embodiments, the model can use a 50-dimensional embedding layer and a 768 directional hidden layer of gated recurrent unit from a recurrent neural network. The model can be initialized using commonly available GloVe word embeddings and can be further trained using commonsense knowledgebase 107. Other methods and systems for generating word embeddings can be used to generate initial embeddings and then can be aggregated with embeddings based on commonsense knowledgebase 107. Premise embedding 135 can then be provided to review comprehension model Review comprehension model 130 uses input data 103 and premise embedding 135 to generate output 145. The specific format of output 145 can depend on the purpose of review comprehension system 100. Example natural language processing tasks can include aspect extracting, aspect sentiment classification, and question and answering. Each of these is discussed in more detail below in reference to FIGS. 4-6 respectively. For aspect extraction, output 145 can be the aspects identified in the review. Aspects can refer to properties, qualities, or other elements of a product or service. For embodiments related to aspect sentiment classification, output 145 can be relative probabilities of the review being positive, negative, or neutral related to an aspect. For embodiments related to question and answering, output 145 can be a span in a review that represents the answer to a provided question.

Review comprehension model 130 can utilize pre-trained Bidirectional Encoder Representations from Transformers, commonly referred to as BERT. Review comprehension model 130 can then take the initial word encodings produced by processing the input through BERT and can augment those word encodings with the premise embeddings. The representation of each token, $T_i$, from the input is appended with the premise or opinion embedding produced by commonsense reasoning model 120. If no premise or opinion was extracted from the input, the token can be appended with a vector of all zeros. If there are multiple opinions extracted from the input, review comprehension model 130 can pick the first extracted opinion and append its embedding. In other embodiments having multiple opinion or premise embeddings, review comprehension model can pick a different embedding. For example, review comprehension model can choose a random premise embedding from the multiple embeddings. In some embodiments, multiple sentences may be processed at the same time resulting in processing multiple premises. The sentences can be processed by review comprehension system 100 sentence by sentence in a sequential order. The sentence can be processed randomly. The sentences can be pre-processed before extracting the opinions. For example, a pre-processing step may group the sentences by their length, number of words or characters. The pre-processing step can group the sentences by domain prior to opinion extractor 110 extracting opinions. In some embodiments, the input can have multiple premises that are all processed one sentence at a time. If a sentence has two or more premises, then the system may select a premise randomly, pick the first premise, or select any premise in the sentence.

Figure 3:
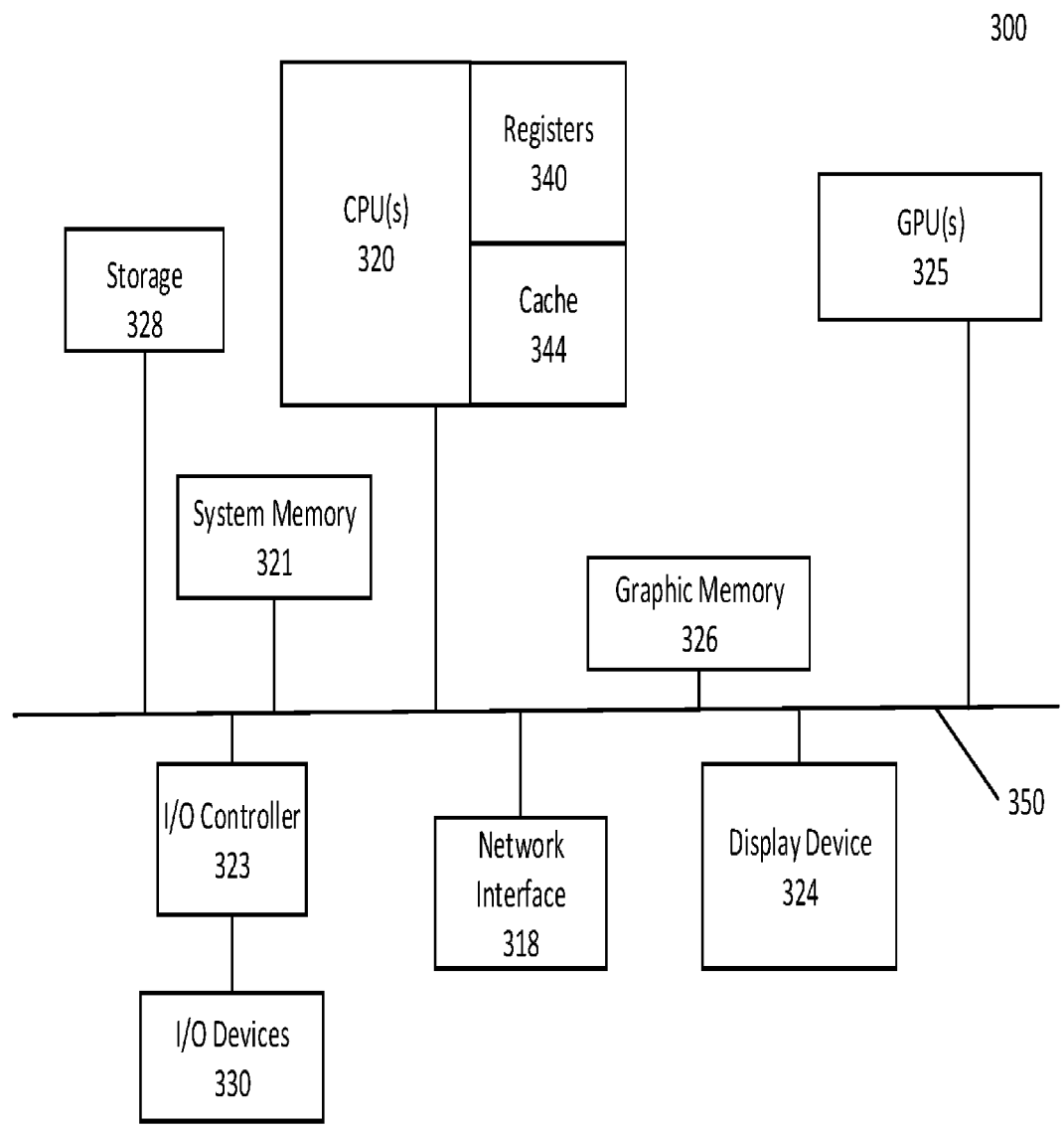
FIG. 3 is a block diagram of an exemplary computing device, consistent with embodiments of the present disclosure.

FIG. 3 is a block diagram of an exemplary computing device 300, consistent with embodiments of the present disclosure. In some embodiments, computing device 300 can be a specialized server providing the functionality described herein. In some embodiments, components of review comprehension system 100, such as input data 103, commonsense knowledge base 107, opinion extractor 110, commonsense reasoning model 120, review comprehension model 130 can be implemented using the computing device 300 or multiple computing devices 300 operating in parallel. Further, the computing device 300 can be a second device providing the functionality described herein or receiving information from a server to provide at least some of the described functionality. Moreover, the computing device 300 can be an additional device or devices that store or provide data consistent with embodiments of the present disclosure and, in some embodiments, computing device 300 can be a virtualized computing device such as a virtual machine, multiple virtual machines, or a hypervisor.

Computing device 300 can include one or more central processing units (CPUs) 320 and a system memory 321. Computing device 300 can also include one or more graphics processing units (GPUs) 325 and graphic memory 326. In some embodiments, computing device 300 can be a headless computing device that does not include GPU(s) 325 or graphic memory 326.

CPUs 320 can be single or multiple microprocessors, field-programmable gate arrays, or digital signal processors capable of executing sets of instructions stored in a memory (e.g., system memory 321), a cache (e.g., cache 341), or a register (e.g., one of registers 340). CPUs 320 can contain one or more registers (e.g., registers 340) for storing various types of data including, inter alia, data, instructions, floating-point values, conditional values, memory addresses for locations in memory (e.g., system memory 321 or graphic memory 326), pointers and counters. CPU registers 340 can include special-purpose registers used to store data associated with executing instructions such as an instruction pointer, an instruction counter, or a memory stack pointer. System memory 321 can include a tangible or a non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive or flash memory, processor cache, memory register, or a semiconductor memory. System memory 321 can be one or more memory chips capable of storing data and allowing direct access by CPUs 320. System memory 321 can be any type of random-access memory (RAM), or other available memory chip capable of operating as described herein.

CPUs 320 can communicate with system memory 321 via a system interface 350, sometimes referred to as a bus. In embodiments that include GPUs 325, GPUs 325 can be any type of specialized circuitry that can manipulate and alter memory (e.g., graphic memory 326) to provide or accelerate the creation of images. GPUs 325 can have a highly parallel structure optimized for processing large, parallel blocks of graphical data more efficiently than CPUs 320. Furthermore, the functionality of GPUs 325 can be included in a chipset of a special purpose processing unit or a co-processor.

CPUs 320 can execute programming instructions stored in system memory 321 or other memory, operate on data stored in memory (e.g., system memory 321), and communicate with GPUs 325 through the system interface 350, which bridges communication between the various components of the computing device 300. In some embodiments, CPUs 320, GPUs 325, system interface 350, or any combination thereof, are integrated into a single chipset or processing unit. GPUs 325 can execute sets of instructions stored in memory (e.g., system memory 321), to manipulate graphical data stored in system memory 321 or graphic memory 326. For example, CPUs 320 can provide instructions to GPUs 325, and GPUs 325 can process the instructions to render graphics data stored in the graphic memory 326. Graphic memory 326 can be any memory space accessible by GPUs 325, including local memory, system memory, on-chip memories, and hard disk. GPUs 325 can enable displaying of graphical data stored in graphic memory 326 on display device 324 or can process graphical information and provide that information to connected devices through network interface 318 or I/O devices 330.

Computing device 300 can include a display device 324 and input/output (I/O) devices 330 (e.g., a keyboard, a mouse, or a pointing device) connected to I/O controller 323. I/O controller 323 can communicate with the other components of computing device 300 via system interface 350. It should now be appreciated that CPUs 320 can also communicate with system memory 321 and other devices in manners other than through system interface 350, such as through serial communication or direct point-to-point communication. Similarly, GPUs 325 can communicate with graphic memory 326 and other devices in ways other than system interface 350. In addition to receiving input, CPUs 320 can provide output via I/O devices 330 (e.g., through a printer, speakers, bone conduction, or other output devices).

Furthermore, the computing device 300 can include a network interface 318 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a, 802.11b, 802.11b/g/n, 802.11ac, Bluetooth, Bluetooth LTE, 3GPP, or WiMax standards), or some combination of any or all of the above. Network interface 318 can comprise a built-in network adapter, network interface card, PCMCIA network card, card bus network adapter, wireless network adapter, USB network adapter, modem or any other device suitable for interfacing the computing device 300 to any type of network capable of communication and performing the operations described herein.

Figure 4:
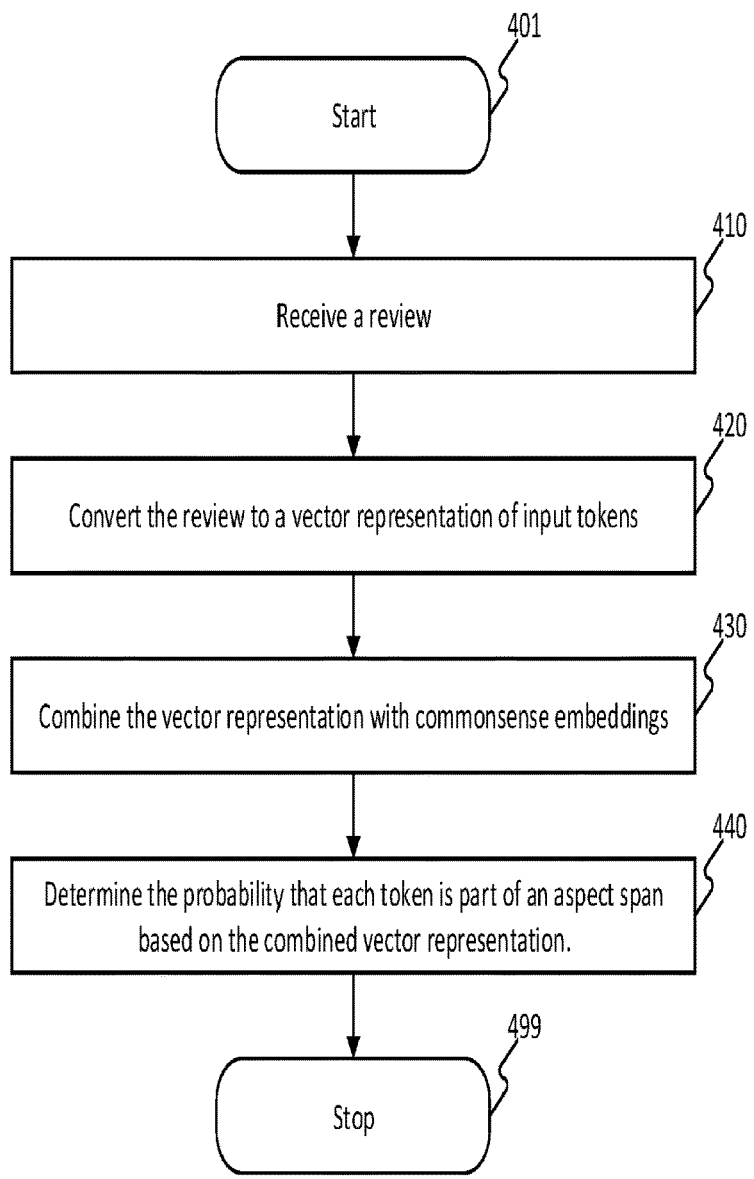
FIG. 4 is a flowchart showing an exemplary method for aspect extraction, consistent with embodiments of the present disclosure.

FIG. 4 is a flowchart showing an exemplary aspect extraction method 400 for extracting aspect spans from a review, consistent with embodiments of the present disclosure. The steps of aspect extraction method 400 can be performed by review comprehension system 100 of FIG. 1 executing on or otherwise using the features of computing device 300 of FIG. 3 for purposes of illustration. It is appreciated that the illustrated aspect extraction method 400 can be altered to modify the order of steps and to include additional steps.

Aspect extraction method 400 begins at step 401. In step 410, review comprehension system 100 can receive a review as input as, for example, input data 103. Review comprehension system 100 can receive the review over a network at, for example, network interface 318. In some embodiments, review comprehension system 100 can receive the review from a directly connected database or storage medium such as, for example, storage 328 or system memory 321.

In step 420, the review comprehension system 100 can split the review into tokens and convert each token into a vector representation. The vector representation can be generated, for example, using BERT as part of the review comprehension model 130.

In step 430 review comprehension model 130 can combine the vector representation from step 420 with commonsense word embeddings (e.g., premise embedding 135) provided by, for example, commonsense reasoning model 120. At step 440, review comprehension model can use the combination of the premise embedding 135 and the vector representations of input tokens from step 420 to determine the probability that each token is part of an aspect span.

Aspect extraction method 400 ends at step 499. Through the described method, review comprehension system 100 can be used to identify aspects from a review. For example, a review that includes the text "The food was tasty, but . . . ," aspect extraction method 400 can be used to identify that "food" is an aspect in the review.

Figure 5:
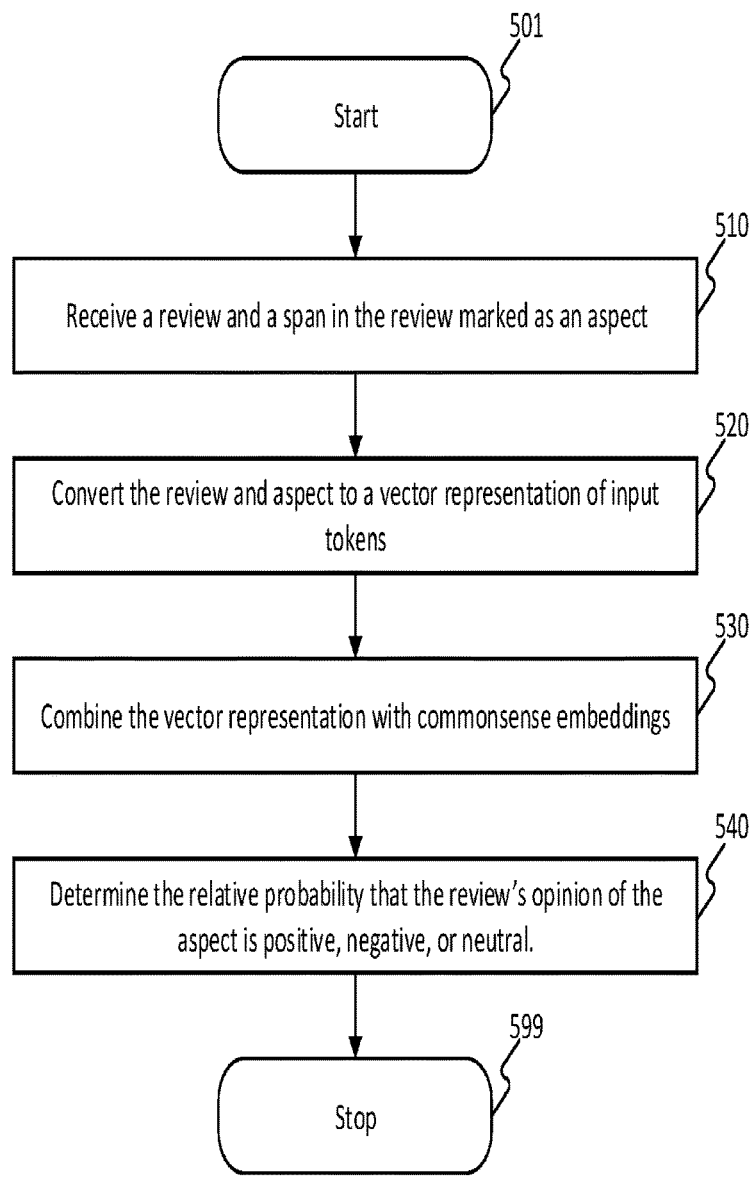
FIG. 5 is a flowchart showing an exemplary method for aspect sentiment classification, consistent with embodiments of the present disclosure.

FIG. 5 is a flowchart showing an exemplary aspect sentiment classification method 500, consistent with embodiments of the present disclosure. The steps of aspect sentiment classification method 500 can be performed by review comprehension system 100 of FIG. 1 executing on or otherwise using the features of computing device 300 of FIG. 3 for purposes of illustration. It is appreciated that the illustrated aspect sentiment classification method 500 can be altered to modify the order of steps and to include additional steps.

Aspect sentiment classification method 500 begins at step 501. In step 510, review comprehension system 100 can receive a review and a span in the review marked as an aspect as input, for example, input data 103. Review comprehension system 100 can receive the review and marked span over a network at, for example, network interface 318. In some embodiments, review comprehension system 100 can receive the review and marked span from a directly connected database or storage medium such as, for example, storage 328 or system memory 321.

In step 520, review comprehension system 100 can split the review into tokens. Review comprehension system 100 can additionally append a token representing the span marked as the aspect to the tokens representing the review. The review tokens and aspect token can be separated by a special "[SEP]" token. These tokens, along with a "[CLS]" token representing the entire review, can be processed using BERT to generate a vector representation of the input.

At step 530 the vector representation of the review and marked span can be combined with premise embeddings (e.g., premise embedding 135) from commonsense reasoning model 120. The premise embeddings can be appended to the vector representation generated by review comprehension model 130 to augment the representation with the premise embeddings from the commonsense reasoning model. A dense neural network layer can be added to the further process the augmented representation with the premise embeddings.

In step 540 review comprehension model 130 can, using the dense neural network layer and augmented vector representation, determine the relative probability that the review as it relates to the marked span is positive, negative, or neutral. Aspect sentiment classification method 500 ends at step 599.

Figure 6:
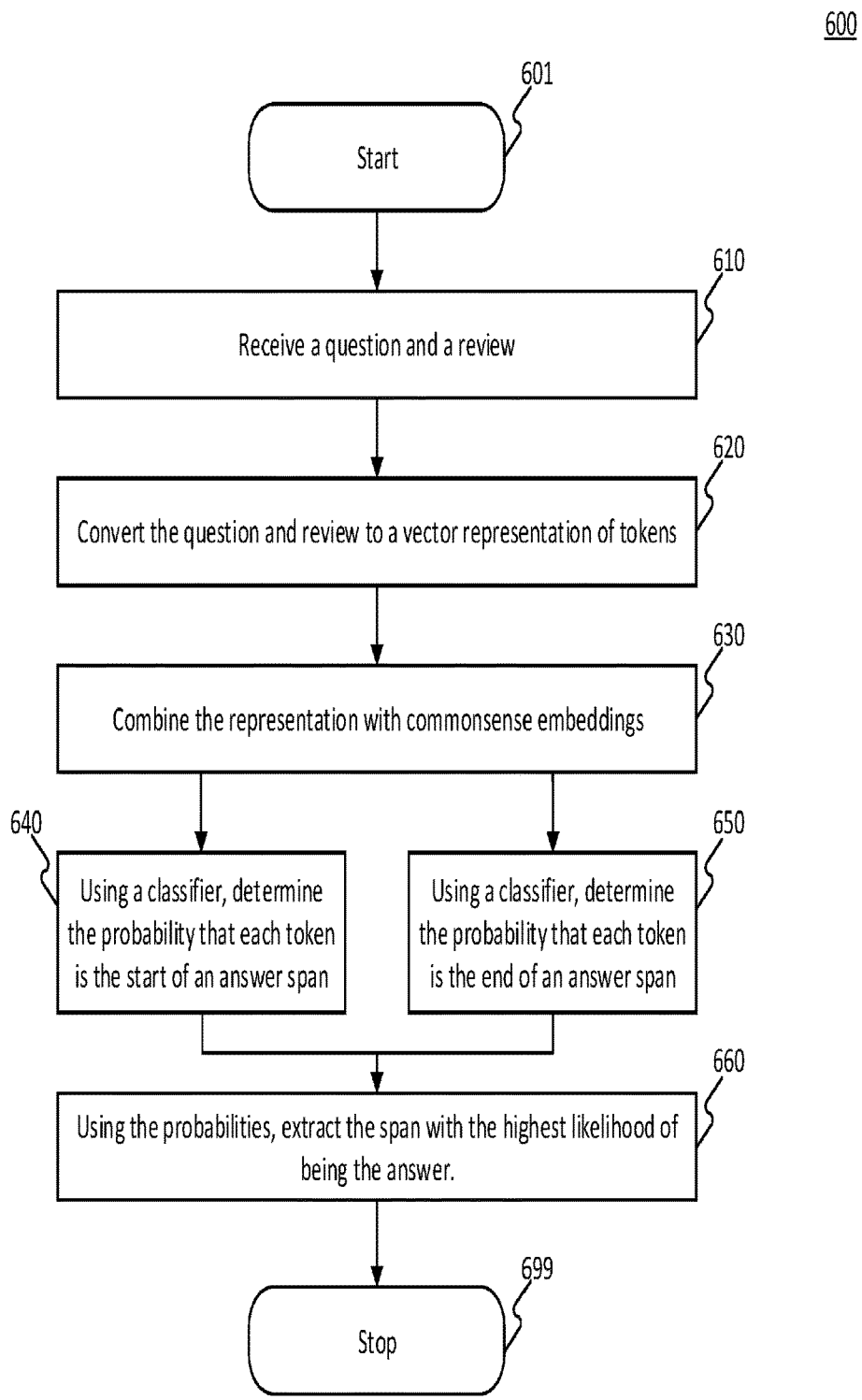
FIG. 6 is a flowchart showing an exemplary method for question and answering, consistent with embodiments of the present disclosure.

FIG. 6 is a flowchart showing an exemplary question and answer method 600, consistent with embodiments of the present disclosure. The steps of question and answer method 600 can be performed by review comprehension system 100 of FIG. 1 executing on or otherwise using the features of computing device 300 of FIG. 3 for purposes of illustration.

It is appreciated that the illustrated aspect extraction method 600 can be altered to modify the order of steps and to include additional steps.

Question and answer method 600 begins at step 601. In step 610, review comprehension system 100 can receive a question and a review as input, for example, input data 103. Review comprehension system 100 can receive the question and review over a network at, for example, network interface 318. In some embodiments, review comprehension system 100 can receive the question and review from a directly connected database or storage medium such as, for example, storage 328 or system memory 321.

In step 620, review comprehension system 100 can split the question and review into tokens. Review comprehension system 100 can separate the tokens representing the question and review with a special "[SEP]" token. These tokens, along with a "[CLS]" token representing the entire input, can be processed using BERT to generate a vector representation of the input.

At step 630 the vector representation of the review and question can be combined with premise embeddings (e.g., premise embedding 135) from commonsense reasoning model 120. The premise embeddings can be appended to the vector representation generated by review comprehension model 130 to augment the representation with the premise embeddings from the commonsense reasoning model.

In step 640 review comprehension model 130 can add a classifier, such as a dense neural network layer to the augmented vector representation. The dense neural network layer can be used to determine the probability for each token in the representation that the token is the start of an answer span to the question.

In step 650 review comprehension model 130 can add another classifier, such as a second dense neural network layer to the augmented vector representation. The dense neural network layer can be used to determine the probability for each token in the representation that the token is the end of an answer span to the question.

In step 660, review comprehension model 130 can analyze the probabilities generated in steps 640 and 650 and extract a span starting at the token with the highest start probability and ending at the token with the highest end probability representing the span that has the highest probability of being the answer. Question and answer method 600 ends at step 699.

Figure 7:
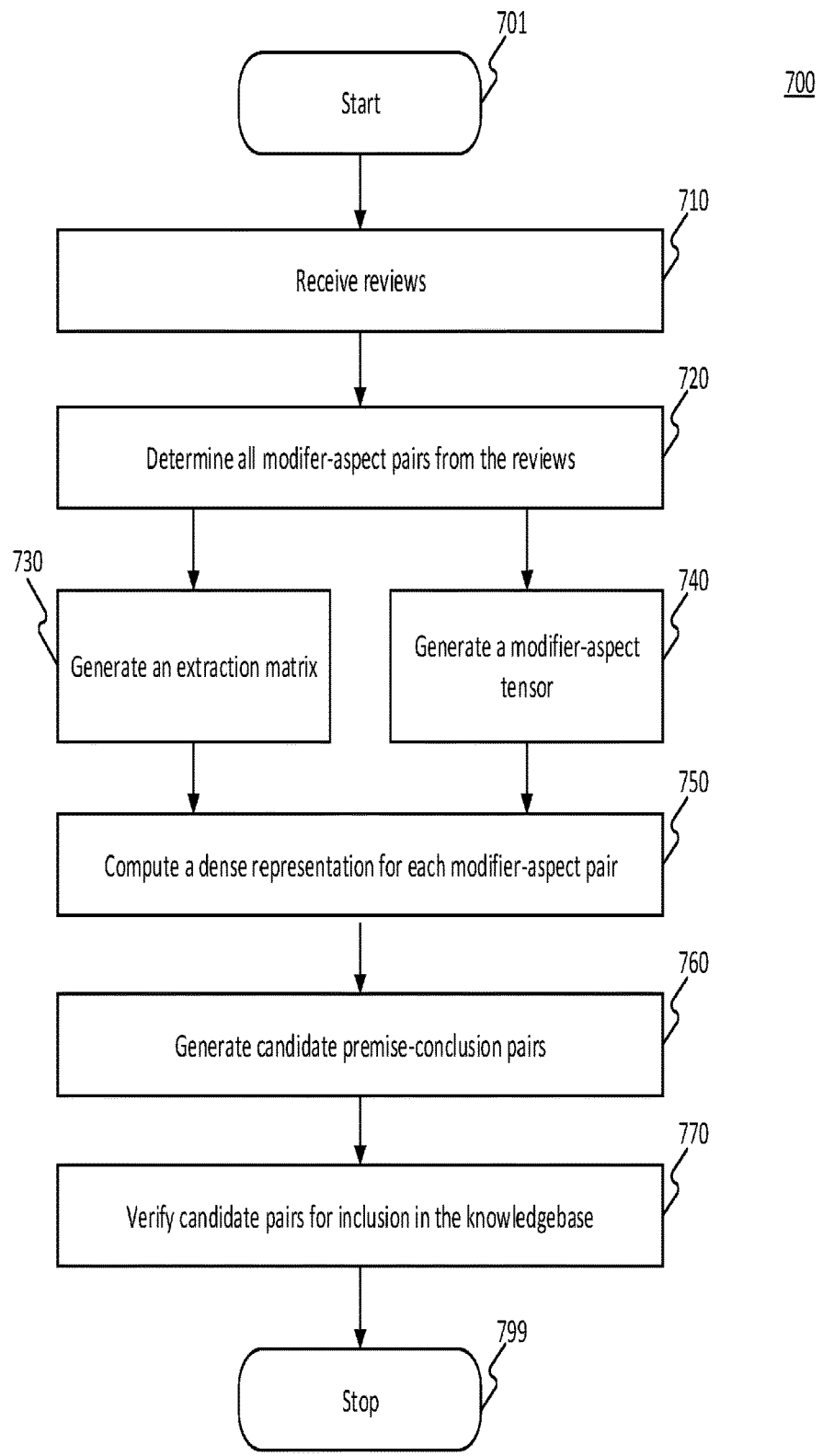
FIG. 7 is a flowchart showing an exemplary method for knowledge base creation, consistent with embodiments of the present disclosure.

FIG. 7 is a flowchart showing an exemplary commonsense knowledgebase creation method 700, consistent with embodiments of the present disclosure. As described above the commonsense knowledgebase can provide information on what opinions can result in certain conclusions. For example, the review "fresh sashimi" can imply "good Japanese restaurant. Building this knowledgebase can be challenging. In some reviews, the relationships between the review opinions and the conclusions are not explicit. Additionally, in some reviews the relationships may not always be completely factual. For example, using the example above, a review of "fresh sashimi" could, in some examples, can apply to a "low quality Japanese restaurant." The steps and methods described in commonsense knowledgebase creation method 700 can overcome these challenges to generate effective domain-specific, commonsense knowledgebases.

The steps of question and answer method 700 can be performed by review comprehension system 100 of FIG. 1 executing on or otherwise using the features of computing device 300 of FIG. 3 for purposes of illustration. It is appreciated that the illustrated aspect extraction method 600 can be altered to modify the order of steps and to include additional steps.

Commonsense knowledgebase creation method 700 begins at step 701. In step 710, review comprehension system 100 can receive reviews as input, for example, input data 103. Review comprehension system 100 can receive the reviews over a network at, for example, network interface 318. In some embodiments, review comprehension system 100 can receive the reviews from a directly connected database or storage medium such as, for example, storage 328 or system memory 321.

At step 720, review comprehension system 100 can determine, for example using opinion extractor 110, all modifier and aspect pairs.

Figure 8:
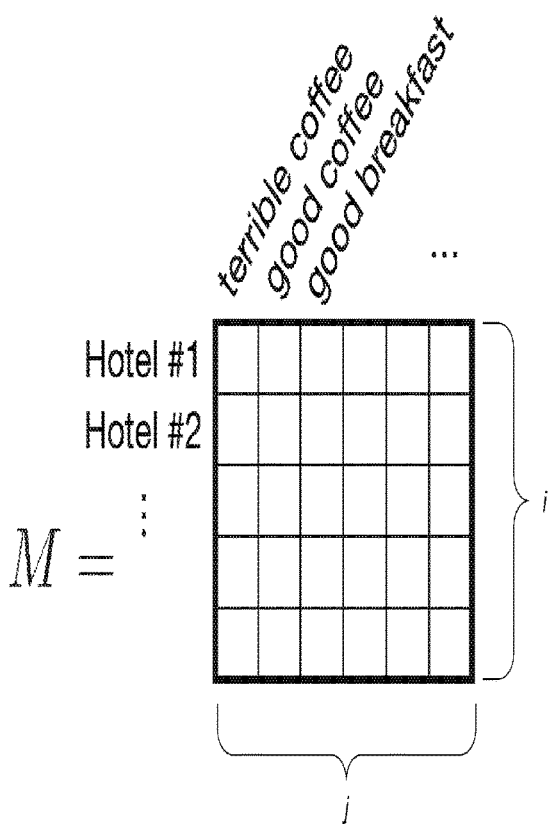
FIG. 8 is a diagram of an exemplary extraction matrix data structure, consistent with embodiments of the present disclosure.

At step 730, review comprehension system 100 can generate an extraction matrix to represent the modifier and aspect pairs. An example extraction matrix is shown in FIG. 8. As shown in FIG. 8, extraction matrix 800 can represent an extraction matrix generated using the modifier and aspect pairs determined in step 720 of commonsense knowledgebase creation method 700 of FIG. 7. Rows i of extraction matrix 800 can represent the products, services, or entities being reviewed Columns j of extraction matrix 800 can represent the modifier and aspect pairs extracted by, for example, opinion extractor 110 of review comprehension system 100 in step 720 of FIG. 7. Each entry in extraction matrix 800, represented as $M_{ij}$ represents the number of times that the modifier and aspect pair j is in reviews for that particular product, service, or entity i.

Figure 9:
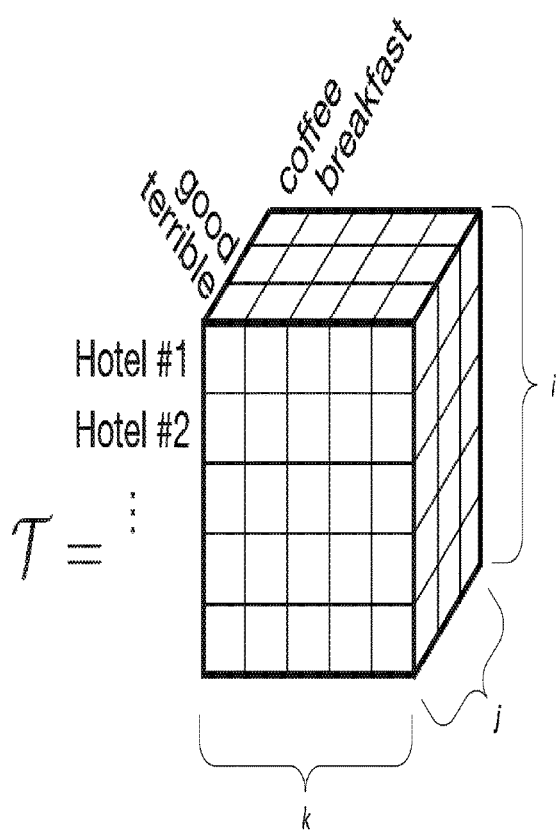
FIG. 9 is a diagram of an exemplary modifier-aspect tensor data structure, consistent with embodiments of the present disclosure.

Referring back to FIG. 7, at step 740, review comprehension system 100 can generate a modifier-aspect tensor as an additional representation of the modifier and aspect pairs determined in step 720 of commonsense knowledgebase creation method 700 of FIG. 7. An example, modifier-aspect tensor is shown in FIG. 9. As shown in FIG. 9, modifier-aspect tensor 900 can be a three-dimensional representation of the modifier and aspect relationships. Third dimension k of modifier-aspect tensor 900 can represent aspects extracted from the review. Second dimension j of modifier-aspect tensor 900 can represent the modifiers extracted from the reviews. First dimension i of modifier-aspect tensor 900 can represent the products, services, or entities being reviewed. Each entry in modifier-aspect tensor 900, represented as $T_{ijk}$ represents number of times that modifier j on aspect k is in reviews of product, service, or entity i.

Referring back to FIG. 7, at step 750 review comprehension system can generate a dense representation of each modifier aspect pair using the extraction matrix (e.g., extraction matrix 800 from FIG. 8) and the modifier-aspect tensor (e.g., modifier-aspect tensor 900 from FIG. 9). The dense representation can be computed using tensor factorization to decompose the extraction matrix and modifier-aspect tensor.

To decompose the extraction matrix, e.g., extraction matrix 800 from FIG. 8, each product, service, or other entity i and modifier and aspect pair j can be represented with d-dimensional vectors $v_i$ and $v_j$ Such that the inner product, $\hat{M}_{ij} = v_i v_j$, approximates $M_{ij}$. These vectors can be computed to minimize the Frobenius norm denoted as $\|\hat{M}_{ij} - M_{ij}\|$.

To decompose the aspect-modifier tensor, e.g. aspect-modifier tensor 900 from FIG. 9, product, service, or other entity i, modifier j, and aspect k, can be represented with d-dimensional vectors $v_i$, $v_j$, and $v_k$, such that the sum of their Hadamard products, represented as $\hat{T}_{ijk} = 1 \cdot (v_i \cdot v_j \cdot v_k)$, approximates $T_{ijk}$. These vectors can be computed to minimize the Frobenius norm denoted as, for example, $\|\hat{T}_{ij} - T_{ij}\|$.

The vectors described above can be computed using, for example, a PARAFAC factorization technique commonly known in the industry. At step 760, the dense representations of the extraction matrix and the modifier-aspect tensor are used to generate candidate premise-conclusion pairs. In some embodiments, only data from the extraction matrix is used. In other embodiments, only data from the modifier-aspect tensor is used. In some embodiments, data from both the extraction matrix and the modifier-aspect tensor are used to produce better results. For each modifier and aspect pair, review comprehension system 100 can identify a number of other pairs (e.g., 3 additional pairs) having representations corresponding to the highest cosine similarity to the original modifier and aspect pair. The embeddings that have high cosine similarities are likely to be related. Using these similarities, review comprehension system 100 can generate candidate pairs to represent the premise and opinions for the reviews.

At step 770, the candidates generated by review comprehension system 100 are verified. The verification process can mark the candidate pairs as unrelated, equivalent, or if one candidate implies the other candidate. The verification process can be performed by human annotators. In some embodiments, the verification process can be done using trained models. The verified candidates are then included in the commonsense knowledgebase.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart or block diagram block or blocks Any combination of one or more computer readable medium(s) may be utilized. The computer readable medium may be a non-transitory computer readable storage medium. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations for example embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable storage medium storing instructions that are executable by a review comprehension system that includes one or more processors to cause the review comprehension system to perform operations for natural language processing, the operations comprising:
   receiving input text;
   extracting, from the input text, a modifier and aspect pair;
   generating a first data structure based on the modifier and aspect pair;
   generating a second data structure based on the modifier and aspect pair;
   computing a dense representation of the modifier and aspect pair based on the first data structure and the second data structure;
   generating candidate premise-conclusion pair based on the cosine similarity of the modifier and aspect pair to other modifier and aspect pairs; and
   including premise-conclusion pair in a database, wherein the candidate premise-conclusion pairs relationship is verified using a machine learning model to other candidates for marking for inclusion in the database.

2. The non-transitory computer readable storage medium of claim 1, wherein the input text includes one or more reviews.

3. The non-transitory computer readable storage medium of claim 1, wherein the first data structure is an extraction matrix to represent the modifier and aspect pair.

4. The non-transitory computer readable storage medium of claim 3, wherein the extraction matrix further comprises:
   a row representing the input text; and
   a column representing the modifier and aspect pair extracted from the input text.

5. The non-transitory computer readable storage medium of claim 3, wherein the extraction matrix comprises a value in a cell representing the number of times the modifier and aspect pair appears in the input text.

6. The non-transitory computer readable storage medium of claim 1, wherein the second data structure is a modifier-aspect tensor.

7. The non-transitory computer readable storage medium of claim 6, wherein the modifier-aspect tensor includes three-dimensional representation of one or more relationships between the modifier and aspect pair.

8. The non-transitory computer readable storage medium of claim 7, wherein the three-dimensional representation of one or more relationships between the modifier and aspect pair further comprises:
   a first dimension representing an aspect of the modifier and aspect pair;
   a second dimension representing a modifier of the modifier and aspect; and
   a third dimension representing an entity described in the input text.

9. The non-transitory computer readable storage medium of claim 1, wherein the dense representation using tensor factorization of the modifier aspect pair includes decomposing the first data structure and the second data structure.

10. A method performed by a comprehension system for natural language processing, the method comprising:
    receiving input text;
    extracting, from the input text, a modifier and aspect pair;
    generating a first data structure based on the modifier and aspect pair;
    generating a second data structure based on the modifier and aspect pair;
    computing a dense representation of the modifier and aspect pair based on the first data structure and the second data structure;
    generating candidate premise-conclusion pair based on the cosine similarity of the modifier and aspect pair to other modifier and aspect pairs; and
    including premise-conclusion pair in a database, wherein the candidate premise-conclusion pairs relationship is verified using a machine learning model to other candidates for marking for inclusion in the database.

11. The method of claim 10, wherein the first data structure is an extraction matrix to represent the modifier and aspect pair.

12. The method of claim 11, wherein the extraction matrix further comprises:
    a row representing the input text; and
    a column representing the modifier and aspect pair extracted from the input text.

13. The method of claim 11, wherein the extraction matrix comprises a value in a cell representing the number of times the modifier and aspect pair appears in the input text.

14. The method of claim 10, wherein the second data structure is a modifier-aspect tensor.

15. The method of claim 14, wherein the modified-aspect tensor includes three-dimensional representation of one or more relationships between the modifier and aspect pair comprising:
    a first dimension representing an aspect of the modifier and aspect pair;
    a second dimension representing a modifier of the modifier and aspect; and
    a third dimension representing an entity described in the input text.

16. A review comprehension system comprising:
    one or more memory devices storing processor executable instructions; and
    one or more processors configured to execute the instructions to cause the review comprehension system to perform:
      receiving input text;
      extracting, from the input text, a modifier and aspect pair;
      generating a first data structure based on the modifier and aspect pair;
      generating a second data structure based on the modifier and aspect pair;
      computing a dense representation of the modifier and aspect pair based on the first data structure and the second data structure;
      generating candidate premise-conclusion pair based on the cosine similarity of the modifier and aspect pair to other modifier and aspect pairs; and
      including premise-conclusion pair in a database, wherein the candidate premise-conclusion pairs relationship is verified using a machine learning model to other candidates for marking for inclusion in the database.

17. The review comprehension system of claim 16, wherein the first data structure is an extraction matrix to represent the modifier and aspect pair.

18. The review comprehension system of claim 17, wherein the extraction matric further comprises:
    a row representing the input text; and
    a column representing the modifier and aspect pair extracted from the input text.

19. The review comprehension system of claim 16, wherein the second data structure is a modifier-aspect tensor.

20. The review comprehension system of claim 19, wherein the modified-aspect tensor includes three-dimensional representation of one or more relationships between the modifier and aspect pair comprising:
- a first dimension representing an aspect of the modifier and aspect pair;
- a second dimension representing a modifier of the modifier and aspect; and
- a third dimension representing an entity described in the input text.

* * * * *